United States Patent
Brealey et al.

(10) Patent No.: US 10,289,632 B1
(45) Date of Patent: May 14, 2019

(54) DYNAMIC ARRAY TYPE IN A DATA STORE SYSTEM

(71) Applicant: Teradata US, Inc, Dayton, OH (US)

(72) Inventors: Elizabeth J. Brealey, San Diego, CA (US); Angelica Garcia-Gutierrez, Chula Vista, CA (US); Michael L. Reed, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 0 days.

(21) Appl. No.: 14/213,084

(22) Filed: Mar. 14, 2014

Related U.S. Application Data

(60) Provisional application No. 61/798,762, filed on Mar. 15, 2013.

(51) Int. Cl.
*G06F 16/28* (2019.01)
*G06F 16/2453* (2019.01)
*G06F 16/2455* (2019.01)
*G06F 16/2457* (2019.01)

(52) U.S. Cl.
CPC ........ *G06F 16/283* (2019.01); *G06F 16/2453* (2019.01); *G06F 16/2455* (2019.01); *G06F 16/2457* (2019.01)

(58) Field of Classification Search
CPC ............. G06F 16/2453; G06F 16/2455; G06F 16/2457; G06F 16/283
See application file for complete search history.

(56) References Cited

U.S. PATENT DOCUMENTS

| 5,978,796 A | * | 11/1999 | Malloy | G06F 17/30592 |
| 2004/0103077 A1 | * | 5/2004 | Hollines, III | G06F 17/30312 |
| 2009/0276410 A1 | * | 11/2009 | Bakalash | G06F 17/30457 |

OTHER PUBLICATIONS

Transact—SQL Users Guide. Internet Archive date Apr. 27, 2006; [retrieved on Apr. 21, 2011]. Retrieved from the internet <URL: http://manuals.sybase.com/onlinebooks/group-as/asg1250e/sqlug/@Generic__BookTextView/5072;pt=4727>.*
Dobson, Rick; Beginning SQL Server 2005 Express, Copyright 2006; p. 179-180.*

* cited by examiner

*Primary Examiner* — Eric T Oberly
(74) *Attorney, Agent, or Firm* — Randy L. Campbell, Jr.

(57) ABSTRACT

A data store system may include a storage device that may store a plurality of data. The data store system may also include a processor in communication with the storage device. The processor may receive a request that references at least one input array having an element type, a size, and a dimension. The processor may further generate an array based on the request. The array may have an element type, a size, and a dimension and at least one of the element type, the size, and the dimension of the array may be different than the element type, the size, and the dimension of the input array. The processor may further generate, using the array, an output in response to the request. A method and computer-readable medium may also be implemented.

16 Claims, 8 Drawing Sheets

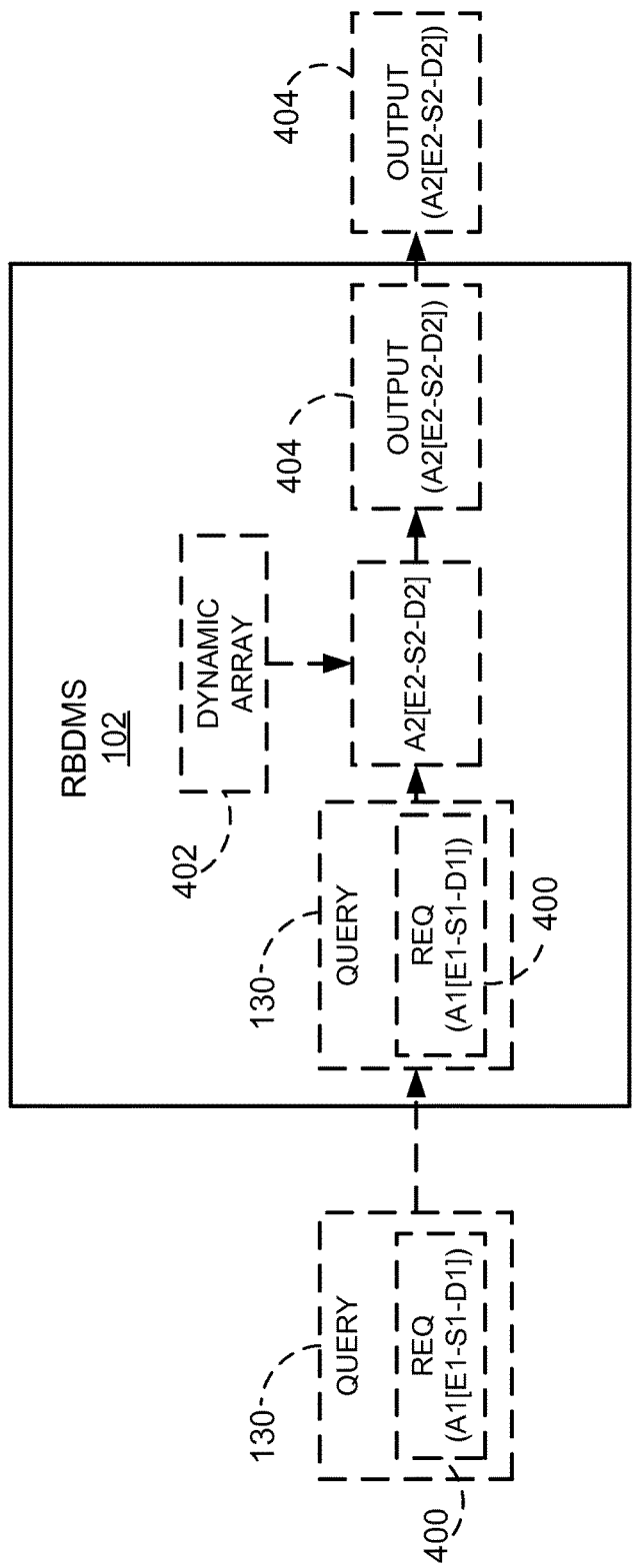

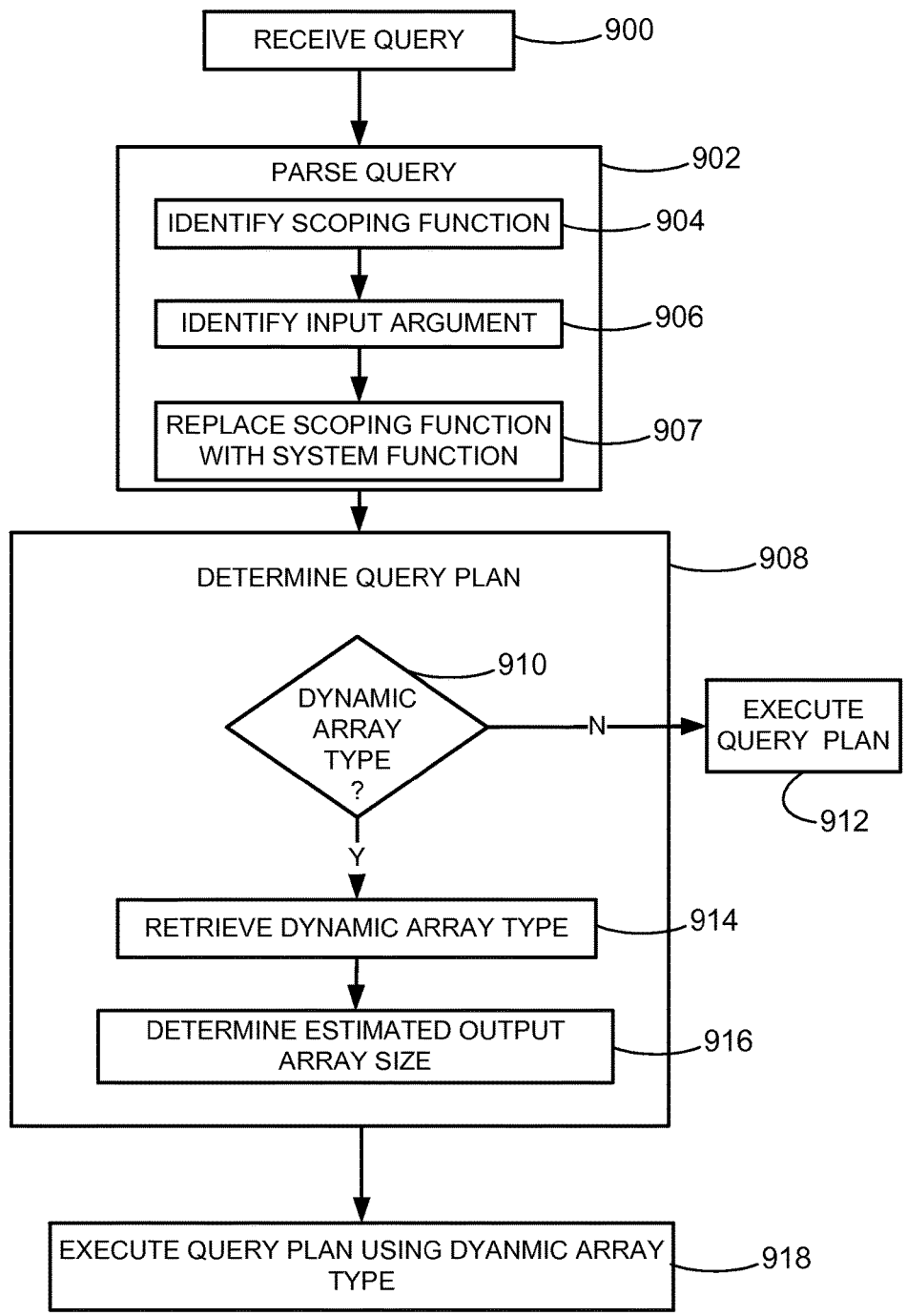

DYNAMIC ARRAY TYPE IN A DATA STORE SYSTEM

CLAIM OF PRIORITY

This application claims the benefit of priority under 35 U.S.C. § 119(e) of U.S. Provisional Patent Application Ser. No. 61/798,762 filed on Mar. 15, 2013, which is hereby incorporated by reference herein in its entirety.

BACKGROUND

1. Technical Field

The present disclosure relates generally to data structures, and more particularly to, dynamic array data structures.

2. Related Art

Data stores are collections of structured or unstructured data used for various purposes, such as record keeping or analytics. One such data store is a database, which is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Various types of analyses may be performed in a data store system. Some analyses may use data arrays as an input. Data store systems require that intermediate or final output arrays generated based on input arrays be the same size and dimension as the input array. This prevents opportunities to perform analyses that would generate arrays for intermediate usage or as a final result that are different in size and dimension than input arrays.

SUMMARY

In one aspect of the present disclosure, a data store system may include a storage device that may store a plurality of data. The data store system may also include a processor in communication with the storage device. The processor may receive a request that references at least one input array having, an element type, a size, and a dimension. The processor may further generate an array based on the request. The array may have an element type, a size, and a dimension and at least one of the element type, the size, and the dimension of the array may be different than the element type, the size, and the dimension of the input array. The processor may further generate, using the array, an output in response to the request.

According to another aspect of the disclosure, a method comprises receiving a request to perform at least one task associated with data store data stored on a persistent storage device. The request references at least one input array having an element type, a size and a dimension. The method may further include determining that an array is to be created based on the request. The method may further include determining, based on the request, an element type, a size, and a dimension of the array. The method may further include accessing a persistently-stored dynamic array data structure. The method may further include generating, with the processor, using the dynamic array data structure, the array. The method may further include processing, with the processor, the request using the array.

According to another aspect of the disclosure, a computer-readable medium may be encoded with computer-executable instructions. The computer-executable instructions may be executable with a processor. The plurality of instructions may include instructions to receive, with a processor, a request to perform at least one task associated with data store data stored on a persistent storage device, wherein the request references at least one input array having an element type, a size, and a dimension. The plurality of instructions may further include instructions to determine that an array is to be created based on the request. The plurality of instructions may further include instructions to determine, based on the request, at least one of an element type, a size, and a dimension of the array. The plurality of instructions may further include instructions to access a persistently-stored dynamic array data structure. The plurality of instructions may further include instructions to generate, using the dynamic array data structure, the array. The plurality of instructions may further include instructions to process the request using the array.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a block diagram of example operation of the example database system of claim 1.

FIG. 9 is an operational flow diagram of example operation of a database system.

DETAILED DESCRIPTION OF THE FIGURES

Figure 1:
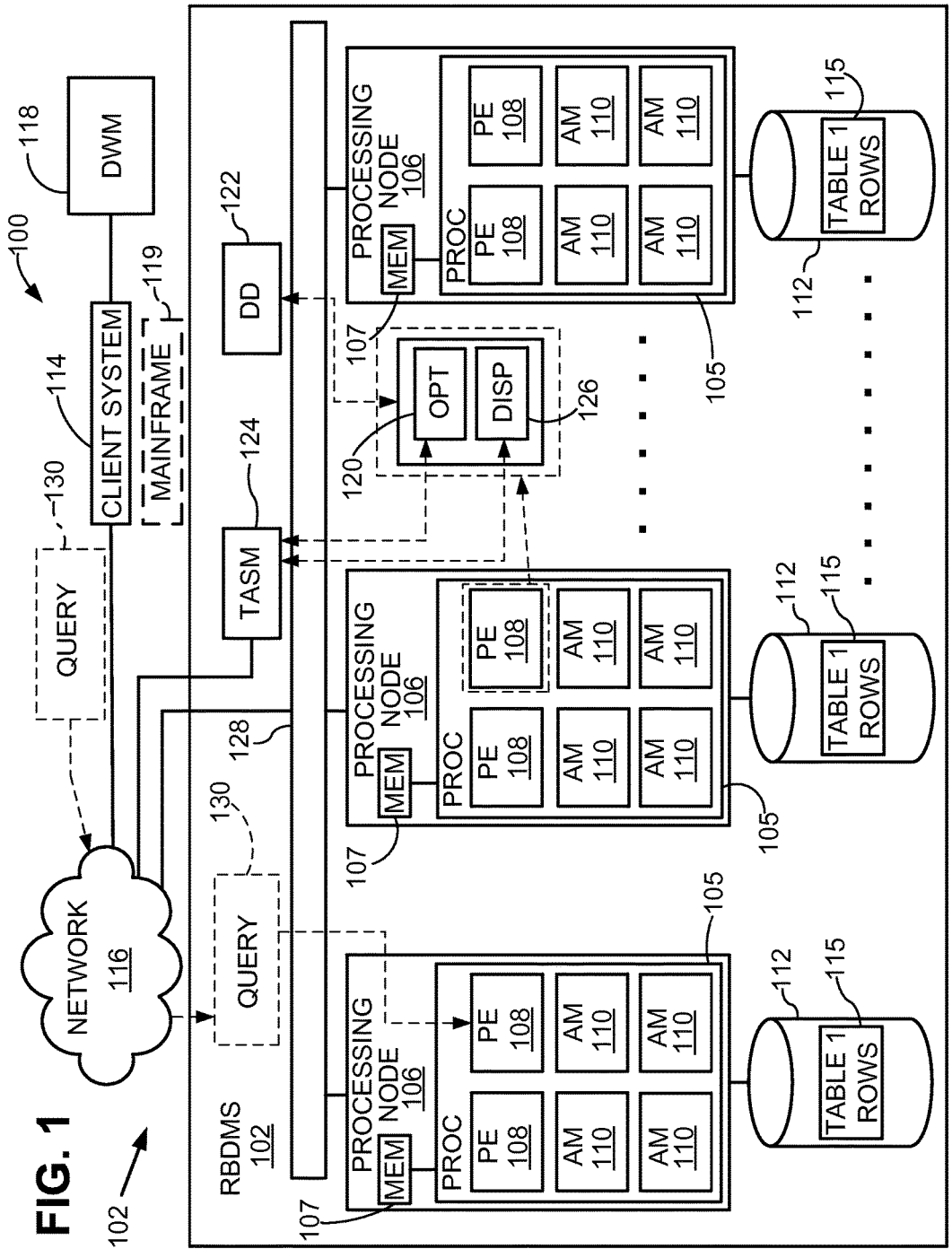
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, each module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processor to implement one or more of the features of the module. When any one of the modules includes the portion of the memory that comprises instructions executable with the processor, the module may or may not include the processor. In some examples, each module may just be the portion of the memory 107 or other physical memory that comprises instructions executable with the processor 106 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management system, such as a Teradata active system management (TASM) module 124. The TASM module 124 may be implemented as a "closed-loop" system management (CLSM) architecture capable of satisfying a set of workload-specific goals. In other words, the RDBMS 102 is a goaloriented workload management system capable of supporting complex workloads and capable of self-adjusting to various types of workloads. The TASM module 124 may communicate with each optimizer module 120, as shown in FIG. 1, and is adapted to convey a confidence threshold parameter and associated parameters to the optimizer module 120 in communication. Further, the TASM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the TASM module 124 via the network 116.

The TASM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the TASM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
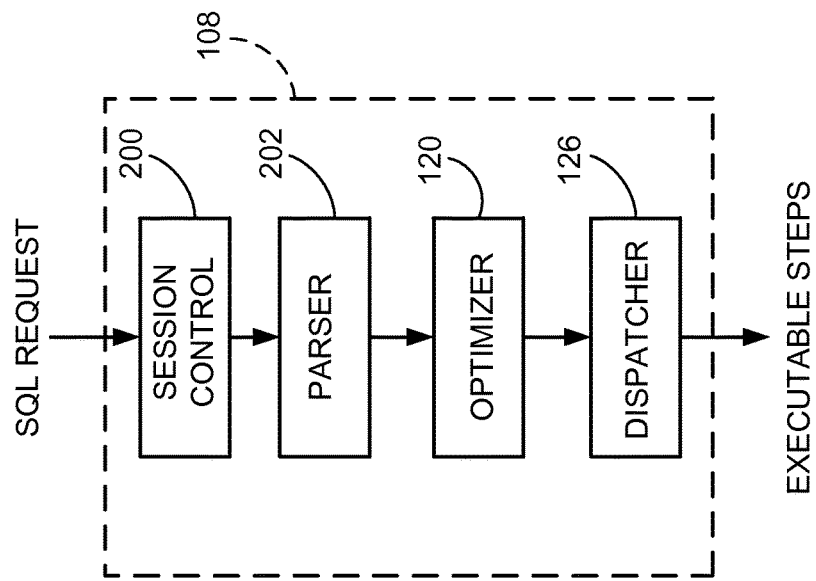
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
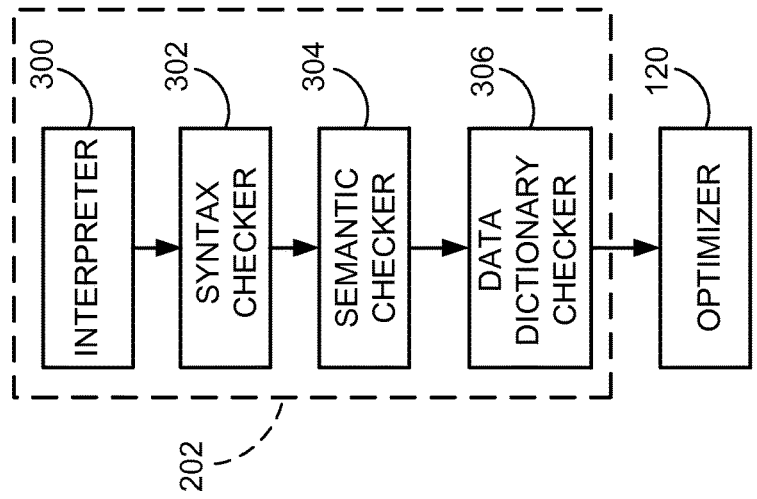
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the TASM 124 monitoring takes place by communicating with the dispatcher module 126 as it checks the query execution step responses from the access modules 110. The step responses include the actual cost information, which the dispatcher module 126 may then communicate to the TASM 124 which, in turn, compares the actual cost information with the estimated costs of the optimizer module 120.

In one example, the query 130 may include one or more requests 400 to process data in the form of an input array. Processing of the input array may result in an output array or intermediate array. In FIG. 4, the query 130 may include a request 400 involving an input array A1 having an element type E1 and a fixed array size of S1 and dimension D1. Array A1 may be received by the RDBMS 102. The RDBMS 102 may process the array A1. Based on the context of the request 400, another array may need to be created to meet the request 400 of the query 130. In such a scenario, the RDBMS 102 may implement a dynamic array type 402 to create a second array A2 having an element type E2 and a size S2 and dimension D2 in order to comply with the request. The dynamic array type 402 may represent an array type the may have a selectively chosen element type and/or be selectively sized and/or dimensioned based on a particular request 400. An element type may also be selected using dynamic array type 402. The element E2, size S2, and dimension D2 of the array A2 may be different than the element type E1, size S1, and dimension D1 of the array A1 based on the result of processing the request 400. Thus, the RDBMS 102 may use the dynamic array type 402 to generate a dynamically-sized/dimensioned array of a size based on the particular request. Such a feature avoids any requirement that an output or intermediate array have a fixed element type, size and/or dimension, such as the size and dimension of an input array. An output 404 may be created in response to the request, which may include the array A2 or may use the array A2 in an intermediate fashion to generate a particular output based on the request 400 of the query 130.

Figure 5:
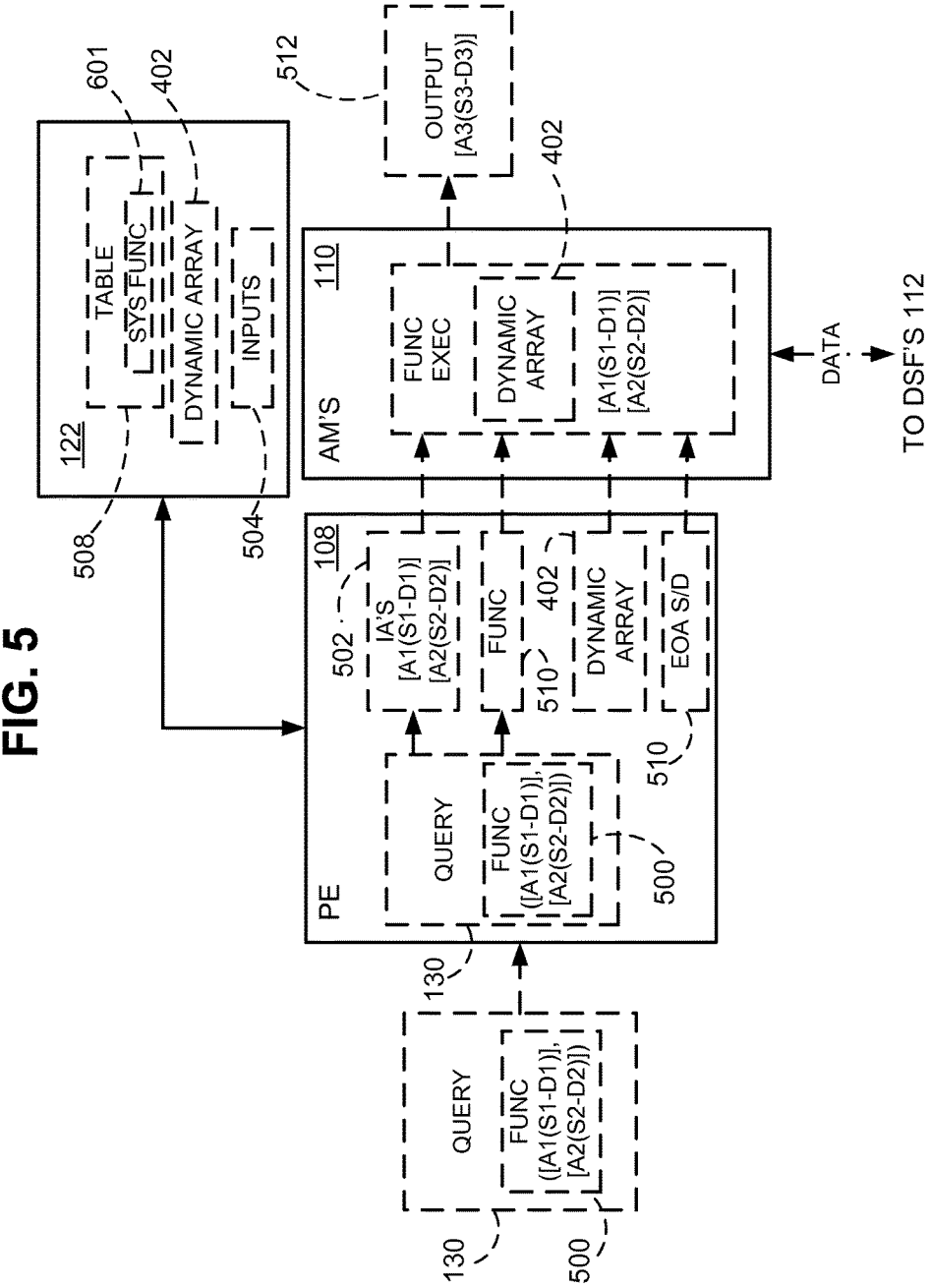
FIG. 5 is a block diagram of example operation of the example database system of claim 1.

In FIG. 5, the query 130 may include a request in the form of a function 500 (FUNC) having input arguments of arrays A1 and A2 each with respective fixed sizes/dimensions S1/D1 and S2/D2. In the example of FIG. 5, the element types of both arrays A1 and A2 may be considered the same. Upon receipt of the query 130 by the RDBMS 102, the query 130 may be passed to one of the parsing engine modules 108. The parsing engine module 108 may parse the query 130 to identify the input arguments 502 (IA'S) in the function 500, which in this case are arrays A1 and A2. Identification of the input arguments 502 may be based on contents included in the data dictionary 122, which includes input types that may be accepted by the database system 100, designated as inputs 504. The parsing engine module 108 may also identify the function 500 based on a specific entry in a table 508 in the data dictionary 122.

During query planning, the parsing engine module 108 may also determine an estimated output array size and dimension 510 (EOA S/D). Based on the estimated size/dimension, which may be different from the sizes/dimensions of either array A1 and A2, the dynamic array type 402 may be retrieved from the data dictionary 122. One or more access modules 110 may execute the query plan, which may include execution of the function (FUNC EXEC) on database data stored in the DSFs 112 in accordance with the input arguments 502. The access modules 110 may generate an output 512 that includes an array A3 as result of the execution of the function 500. The array A3 may be of a size S3 and dimension D3, which may be sized/dimensioned based on the result of the executed function 500. In the example of FIG. 5, the element type of the array A3 may be the same as the arrays A1 and A2. Thus, the size/dimension S3/D3 of the output array A3 may be different than either of the sizes/dimensions S1/D1 and S2/D2 of the input argument arrays A1 and A2. In other examples, the element types of each array A1-A3 may be different or have common combinations, such as A1 and A3, or A2 and A3, for example. In such examples, the dynamic array type 402 may be used to generate an element type for A3 that may be different than array A1 and/or array A2.

Application of the dynamic array type may be illustrated in Example 1. Example 1 includes a series of SQL commands:

Example 1

CREATE TYPE item_price AS DECIMAL(8, 2) ARRAY [10];
CREATE TABLE inventory AS (item_ID INTEGER, regular_price item_price);
INSERT INTO inventory VALUES (101, NEW item_price(5.43, 6.24, 8.31, 5.43, 2.11, 8.31, 1.33, 2.67, 9.49, 1.00));
SELECT ARRAY_MODE(regular_price) FROM inventory;

These SQL statements create a ten-element array "item_price" and then create a table "inventory" that includes two columns "item_ID" and "regular_price." The column "regular_price" contains the array "item_price." The "INSERT INTO" statement places values in the "item_ID" column and the "regular_price" column, which are values for the array "item_price." The "SELECT ARRAY_MODE" command executes a function "ARRAY MODE" that uses the column "regular_price" as the input argument and may determine the elements in the array "item price" that appear with the greatest frequency. In Example 1, the output is an array of [5.43, 8.31] since both 5.43 and 8.31 appear twice in the array. In order to generate such an output, the RDBMS 102 may implement the dynamic array type. The input argument, "item_price" in Example 1 is a ten-element array. Depending on the contents, the output array can vary in size. Thus, the dynamic array type may be implemented by the RDBMS 102 in order to generate an array of a size that is dependent on the content of the input argument allowing a dynamically-sized array to be generated with the proper output.

Example 2 provides another example of dynamic array generation.

Example 2

CREATE TYPE colors_ary AS CHAR(10) ARRAY[5];
CREATE TABLE my_table (garment id INTEGER, garment_colors colors_ary);
Assume that the array garment colors of type colors ary is populated as follows: garment colors=(red', 'orange', 'yellow', 'green', 'blue'). A query may include:
SELECT garment_colors||NEW colors_ary('purple', 'black', 'white') FROM my_table;
This query response returns the concatenation of column garment colors with an instance of array colors_ary, as a dynamic array type. The result is a one-dimensional dynamic array with the following element values: (red', 'orange', 'yellow', 'green', 'blue', 'purple', 'black', 'white'). This example takes two one-dimensional array values of the same type and concatenates them together. The resultant array type is larger than the maximum cardinality of the two array arguments.

Figure 6:
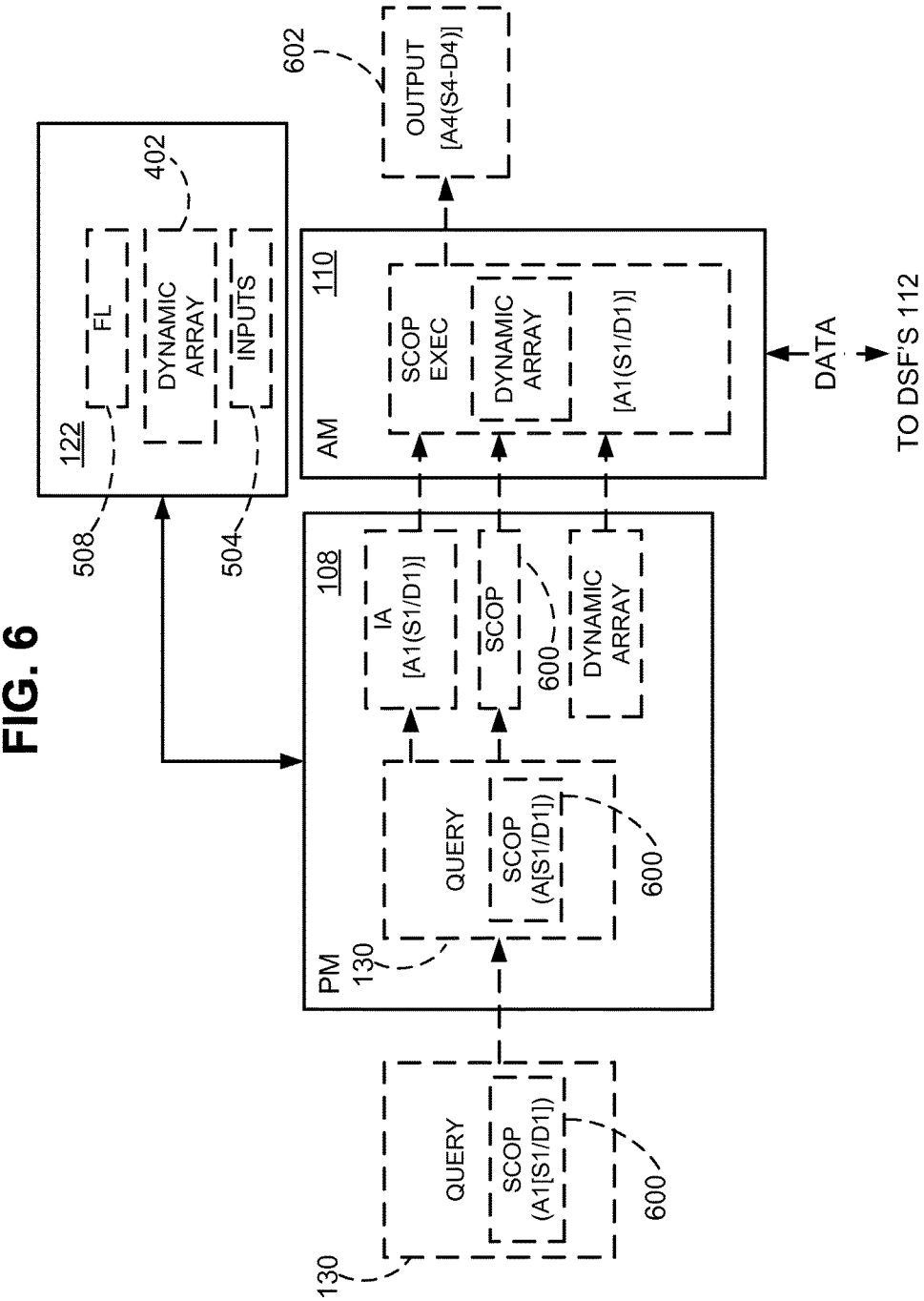
FIG. 6 is a block diagram of example operation of the example database system of claim 1.

In another example, as shown in FIG. 6, the query 130 may include a request in the form of a scoping function 600 (SCOP). The scoping function 600 may allow a subsection of an input argument of a fixed-size/dimension array having an element type to be selected resulting in a differently-sized/dimensioned array. The scoping function 600 may be used independently or may be used in conjunction with other features, such as another function. The scoping function 600 may include an input argument of array A1 of a fixed-size/dimension S1/D1.

In one example, the query 130 may be parsed by a parsing engine module 108. The parsing engine module 108 may identify the scoping function 600 through the syntax of the scoping function 600, which may be replaced by a system function 601 stored in the table 508 in the data dictionary 122. The parsing engine module 108 may also identify the array A1 as the input argument through reference with the inputs 504 of the data dictionary 122. Based on identification of the scoping function 600, the parsing engine module 108 may recognize that the output of the scoping function 600 can result in an array of a varying size/dimension. While the parsing engine module 108 may recognize that execution of the scoping function 600 will result in an output array, until the input array A1 is processed, the array size is indeterminate.

Based on the identification of the scoping function 600 and the input argument array A1, the parsing engine module 108 may determine that the dynamic array type 402 may be implemented to allow a proper output to be created. In one example, the parsing engine module 108 may access the dynamic array type 402 from the data dictionary 122. The dynamic array type 402, as well as the scoping function 600 and the input argument array A1 may be passed to one or more access modules 110 for processing of a query plan. The access modules 110 may access the actual contents of the array A1 from the DSFs 112 and execute the scoping function 600 (SCOP EXEC) accordingly. The result may be an output 602 that includes an array A4 having a size/dimension of S4/D4.

The execution of the scoping function 600 may be used to generate an output array such as array A4 or may be used to create an intermediate result. For example, a function may be desired to be performed on a portion of an input array. In such a scenario, a scoping function 602 may be called to be executed on an input array of a fixed-size/dimension. Using the dynamic array type 402, an intermediate array may be created. The intermediate array may be used for subsequent processing such as by a function. If a function performed on the intermediate array is to result in another array, the dynamic array type 402 may be used again to create an output array based on the execution of the function on the intermediate array. Thus, the dynamic array type 402 may be used as many times as necessary to generate an array of size required to carry out a particular function.

Example 3 provides SQL statements for using a scoping function with the dynamic array type.

Example 3

CREATE TYPE intAry AS INTEGER ARRAY[10];
CREATE TABLE t1 (id INTEGER, ary intAry);
SELECT ary[2:5] FROM t1;

The "CREATE TYPE intAry AS INTEGER ARRAY [10]" statement creates a ten-element integer array "intAry". The "CREATE TABLE t1 (id INTEGER, ary intAry)" creates a two-column table t1, having an integer column "id" and a column "ary" that includes the array intAry. The statement "SELECT ary[2:5] FROM t1" selects elements 2 through 5 of the ten-element array intAry. Due to the input array intAry being a ten-element array, the RDBMS 102 may implement the dynamic array type to generate an output array of a different size to meet the request of the SELECT statement. The RDBMS 102 may process the SQL statements of Example 3 to generate an output array in response to the scoping function to generate a four-element array with elements 2 through 5 of the array intAry.

The scoping function may also include usage of a wildcard character '*' for the lower or upper bound, or both lower and upper bound, which may determine the size of an output array of the scoping function. When this wildcard character is specified, it means all elements from the first or last element, respectively. When the wildcard character is specified for both lower and upper bounds, it means all elements in the array.

A non-constant expression may be passed as one of the bounds to the scoping function. This could be a column value, the result of a function, or a parameter or local variable inside of a stored procedure. This allows more flexibility with the type of scenarios where the scoping function may be executed. For the following examples, consider the following SQL statements.

CREATE TYPE myarray as INTEGER ARRAY[5];
CREATE TABLE mytable (my_id INTEGER, ary MYARRAY);
INSERT INTO mytable (1000, new MYARRAY(100,200, 250,500,225));
INSERT INTO mytable (1001, new MYARRAY(100,200, 230,200,221));

The following two SQL statements in Example 4 are valid and perform the same operation: selects all the elements of the array.

Example 4

SELECT ary[*] from mytable;
SELECT ary[*:*] from mytable;
Expected output: [100,200,250,500,225]
  [100,200,230,200,221]

The following SQL statement in Example 5 selects a subset of elements from the array using a dynamic value in the upper bound. The first selected element is the one present in position 3 of the array. If the array had been defined to have a maximum of ten elements but only five elements had been initialized (to NULL or other valid element value), then the selected elements will be those present from position 3 to 5 of the array. If all the elements have been initialized then the selected elements will be those present in positions from 3 to 10 of the array. Based on the current data stored in mytable, the following query returns the element values in the index positions from 3 to 5.

Example 5

SELECT ary[3:*] from mytable;
Expected output: [250,500,225]
  [230,200,221]

The following SQL statement in Example 6 selects a subset of elements from the array using a dynamic value in the lower bound. Since the target array is a 1-D array type, the first selected element is the one present in position 1 of the array. Thus, the selected elements will be those present in positions from 1 to 5 of the array.

Example 6

SELECT ary[*:5] from mytable;
Expected output: [100,200,250,500,225]
  [100,200,230,200,221]

The following SQL statements in Examples 7a-7d use a column name to define the index values that will be referenced in a given array. Since the array is a 1-D array type, array elements start at position 1.

CREATE TYPE MYARRAY AS INTEGER ARRAY[10];
CREATE TABLE mytable (my_id INTEGER, pos INTEGER, dim1_lo INTEGER, dim1_up INTEGER, ary MYARRAY);
INSERT INTO mytable (1000, 3, 2, 3, new MYARRAY (100,200,250,500));
INSERT INTO mytable (1001, 4, 3, 4, new MYARRAY (100,200,230,200));

Example 7a

SELECT ary[dim1_lo:dim1_up] from mytable;
Expected output: [200, 250]
  [230, 200]

Example 7b

SELECT ary[1:dim1_up] from mytable;
Expected output: [100, 200, 250]
  [100, 200, 230, 200]

Example 7c

SELECT ary[dim1_lo:3] from mytable;
Expected output: [200, 250]

Example 7d

SELECT ary[dim1_lo:5] from mytable;
This query should return an error message to the user since it is making reference to an element that has not been initialized.

Figure 7:
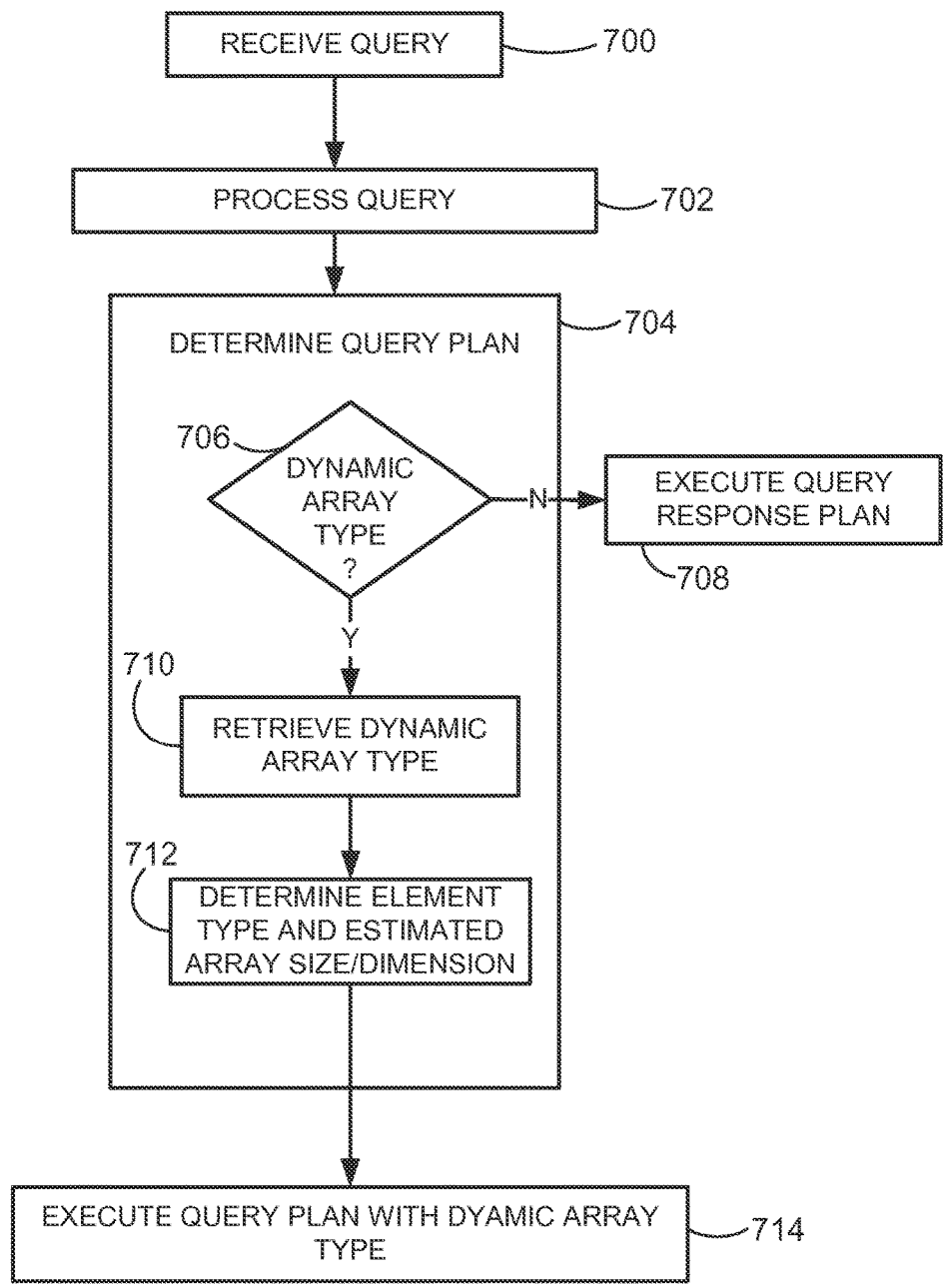
FIG. 7 is an operational flow diagram of example operation of a database system.

FIG. 7 is an operational flow diagram of the RDBMS 102 during use of the dynamic array type. The RDBMS 102 may receive a query 130 (700). The RDBMS 102 may process the query 130 (702). In one example, this may include parsing requests and other items of the query 130. The processing may also include identifying various aspects of query requests, such as functions, input arguments, and data types. The RDBMS 102 may also determine the query plan based on the query 130 (704). During query planning, the RDBMS 102 may determine if the dynamic array type is needed (706) in order to properly respond to the query 130. This determination may be a result of the processing of the query 130. If no dynamic array type is needed, a query response plan for the query 130 may be executed (708).

If a dynamic array type is needed, such as the dynamic array type 402, the RDBMS 102 may retrieve the dynamic array type from the data dictionary 122 (710). The RDBMS 102 may determine the element type and the estimated size/dimension of any array to be generated in order to execute the query plan (712). Upon determination of the element type and estimated size/dimension of any arrays to be generated, the query plan may be executed using the arrays generated from the dynamic array type (714). Execution of the query plan may involve one or more dynamically-sized/dimensioned arrays being implemented to produce an output having a dynamically-sized/dimensioned array or be used for intermediate purposes in producing an output.

Figure 8:
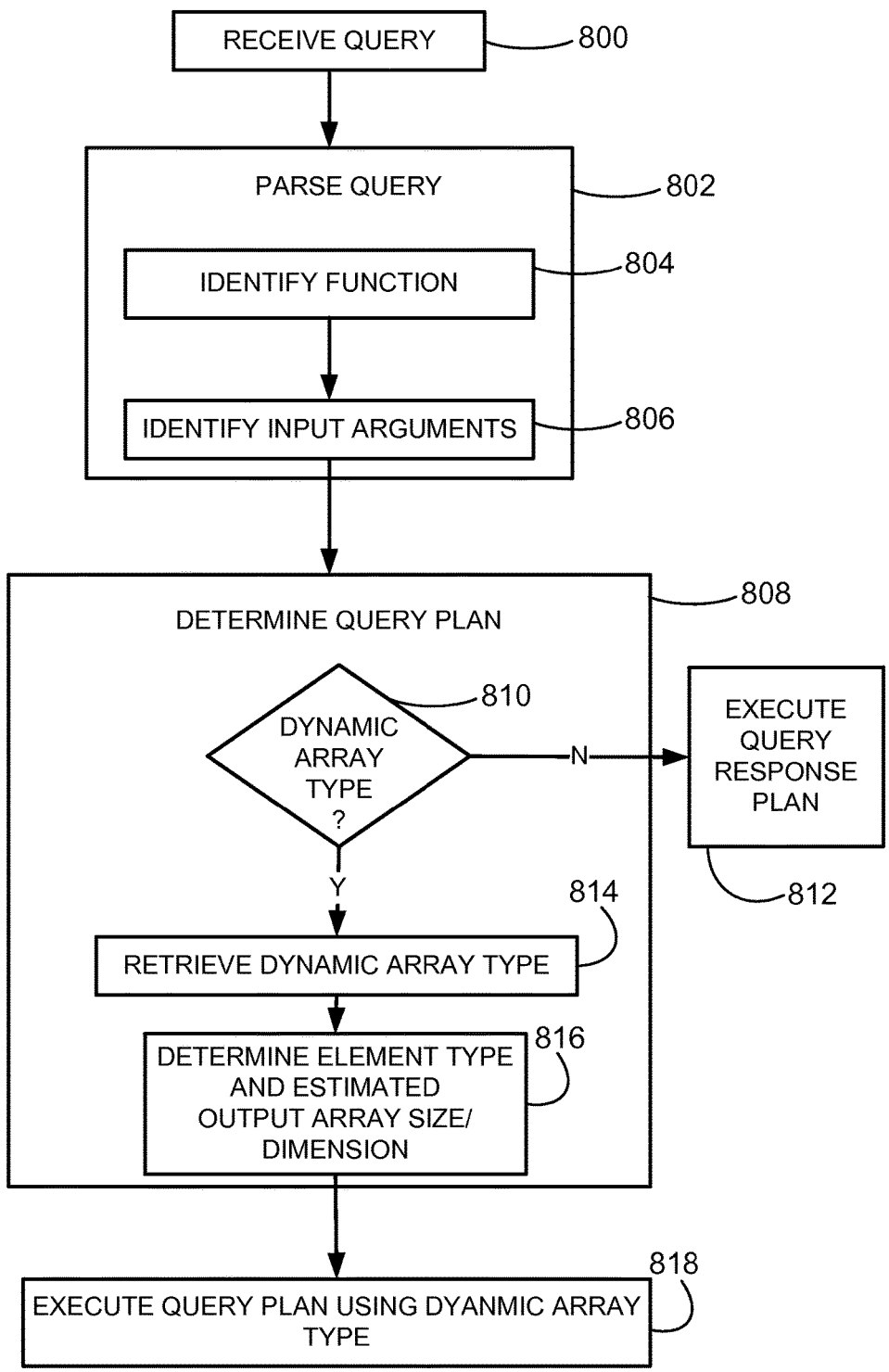
FIG. 8 is an operational flow diagram of example operation of a database system.

FIG. 8 is an example operational flow diagram for the RDBMS 102 during processing a query 130 including a function. In one example, the RDBMS 102 may receive the query 130 (800). The RDBMS 102 may parse the query 130 (802), which may include identification of a function (804) and input arguments (806). The RDBMS 102 may then determine a query plan (808).

During query planning, the RDBMS 102 may determine if a dynamic array type is to be used based on the identified input arguments and function (810). If no dynamic array type is to be used, the RDBMS 102 may execute the query plan (812). If the dynamic array type is to be used, the RDBMS 102 may retrieve the dynamic array type from the data dictionary 122 (814) and determine the element type, size, and dimension of the output array involved with the function (816). Once the plan has been determined, the query plan may be executed using the dynamic array type (818).

FIG. 9 is an example operational flow diagram of the RDBMS 102 processing a query that includes a scoping function, such as the scoping function 600. In one example, the RDBMS 102 may receive the query 130 (900). The RDBMS 102 may parse the query 130 (902) to identify the scoping function (904) and the input argument array (906). Based on recognition of the syntax of the scoping function, the RDBMS 102 may replace the scoping function with a system function to carry out the intended purpose of the scoping function (907). The RDBMS 102 may then determine a query plan (908). During query planning, the RDBMS 102 may determine if a dynamic array type is to be used based on the identified input arguments and function (910). If no dynamic array type is to be used, the RDBMS 102 may execute the query plan accordingly (912). If the dynamic array type is to be used, the RDBMS 102 may retrieve the dynamic array type from the data dictionary 122 (914) and determine the size of the output array involved with the function (916). Once the plan has been determined, the query plan may be executed using the dynamic array type (918).

The examples herein have been provided with the context of a relational database system. However, all examples are applicable to various types of data stores, such as file systems or other data stores suitable for organization and processing of data. Thus, the dynamic array type may be implemented in any data store system that supports arrays and is not limited to use in a relational database system or any other database system. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A data store system comprising:
a storage device configured to store a plurality of data tables;
a processor in communication with the storage device, the processor configured to:
receive a request to perform an operation that uses a column from a data table from the plurality of data tables, wherein each row of the column is configured to store a plurality of elements in an input array structure, wherein each element in the input array structure is independent from each other element in a common row of the column, wherein the input array structure is defined by an element type, a size, and a dimension, wherein the element type, the size, and the dimension are each user-configurable, wherein at least one input array structure of the column comprises a plurality of elements, and wherein a number of the plurality of elements defines both the size and the dimension of the at least one input array structure, wherein the size is defined by a number of columns of elements and the dimension is defined by a number of rows of elements, and wherein the at least one input array structure comprises a plurality of dimensions and the size is greater than one;
create an intermediate column based on the request, wherein each row of the intermediate column contains an array structure configured to store a plurality of elements, wherein each element is independent from each other element in a common row of the column, wherein the array structure has an element type, a size, and a dimension, wherein at least one of the element type, the size, and the dimension of the array structure is different than the element type, the size, and the dimension of the input array structure, wherein the size of the array structure is defined by a number of columns of elements and the dimension is defined by a number of rows of elements, and wherein at least one array structure of the intermediate column comprises a plurality of elements; and
generate, using the intermediate column, an output in response to the request.

2. The data store system of claim 1, wherein the request comprises a function to be performed on the column.

3. The data store system of claim 1, wherein the output contains the intermediate column.

4. The data store system of claim 1, wherein the request comprises a scoping function comprising an upper bound and a lower bound with respect to the input array, structure, wherein at least one of the upper bound and lower bound is defined by the size and dimension of the input array structure.

5. The data store system of claim 4, wherein the array structure of the intermediate column of the output is a subset of the input array structure defined by the upper bound and lower bound of the scoping function.

6. The data store system of claim 1, wherein the input array structure comprises a first input array structure and a second input array structure, wherein the first input array structure and the second input array structure are each configured to have a respective size and respective dimension, wherein at least one of the size and the dimension of the array structure is different than the respective sizes or respective dimensions of the first input array structure and the second input array structure, and wherein the request comprises a request to perform at least one operation that uses a first column and a second column of one or more data tables from the plurality of data tables, wherein each row of the first column is configured to store the first input array structure and each row of the second column is configured to store the second input array structure.

7. A method comprising:
receiving, with a processor, a request to perform at least one task associated with a column of a data table stored on a persistent storage device, wherein each row of the column is configured to store a plurality of elements in an input array, wherein each element in the input array is independent from each other element in a common row of the column, wherein the input array is defined by an element type, a size, and a dimension, wherein the element type, the size, and the dimension are each user-configurable, wherein at least one input array of the column comprises a plurality of elements, and wherein a number of the plurality of elements defines both the size and the dimension of the at least one input array, wherein the size is defined by a number of columns of elements and the dimension is defined by a number of rows of elements, and wherein the at least one input array comprises a plurality of dimensions and the size is greater than one;
determining, with the processor, that an array is to be created based on the request;
determining, with the processor, based on the request, an element type, a size, and dimension of the array;
accessing, with the processor, a persistently-stored dynamic array data structure;
generating, with the processor, using the dynamic array data structure, the array, wherein at least one of the element type, size, and dimension of the array is different from the element type, size, or dimension of the input array, and wherein the size of the array is defined by a number of columns of elements and the dimension of the array is defined by a number of rows of elements; and
processing, with the processor, the request using the array.

8. The method of claim 7, wherein the request comprises a function to be performed on the column, and wherein processing, with the processor, the request using the array comprises executing, with the processor, the function on the column to produce the array.

9. The method of claim 7, wherein the request comprises a scoping function to be performed on the column, wherein the scoping function comprises an upper bound and a lower bound with respect to the input array, and wherein at least one of the upper bound and lower bound is defined by the size and dimension of the input array, and wherein processing, with the processor, the request using the array comprises executing, with the processor, the scoping function on the column to produce the array.

10. The method of claim 9, wherein the output includes the array, and wherein the array is configured to be a subset of the input array defined by the upper bound and lower bound of the scoping function.

11. The method of claim 7, wherein the input array comprises a first input array and a second input array, wherein the first input array and the second input array are each configured to have a respective size and respective dimension, wherein at least one of the size and the dimension of the array is different than the respective sizes or respective dimensions of the first input array and the second input array, and wherein the request comprises a request to perform at least one task that uses a first column and a second column of the data table, wherein each row of the first column is configured to store the first input array and each row of the second column is configured to store the second input array.

12. A non-transitory computer-readable medium encoded with a plurality of instructions executable with a processor, the plurality of instructions comprising:
instructions to receive a request to perform at least one task associated with a column of a data table stored on a persistent storage device, wherein each row of the column is configured to store a plurality of elements in an input array, wherein each element in the input array is independent from each other element in a common row of the column, wherein the input array defined by an element type, a size, and a dimension, wherein the element type, the size, and the dimension are each user-configurable, wherein at least one input array comprise a plurality of elements, and wherein a number of the plurality of elements defines both the size and the dimension of the at least one input array, wherein the size is defined by a number of columns of elements and the dimension is defined by a number of rows of elements, and wherein the at least one input array comprises a plurality of dimensions and the size is greater than one;
instructions to determine that an array is to be created based on the request;
instructions to determine, based on the request, at least one of an element type, size, and dimension of the array;
instructions to access a persistently-stored dynamic array data structure;
instructions to generate, using the dynamic array data structure, the array, wherein at least one of the element type, size, and dimension of the array is different from the element type, size, or dimension of the input array, and wherein the size of the array is defined by a number of columns of elements and the dimension of the array is defined by a number of rows of elements; and
instructions to process the request using the array.

13. The non-transitory computer-readable medium of claim 12, wherein the request comprises a function to be performed on the column, and wherein the instructions to process the request using the array comprise instructions to execute the function on the column to produce the array.

14. The non-transitory computer-readable medium of claim 12, wherein the request comprises a scoping function comprising an upper bound and a lower bound with respect to the input array, wherein at least one of the upper bound and lower bound is defined by the size and dimension of the input array, and wherein the instructions to process the request using the array comprise instructions to execute the scoping function on the column to produce the array.

15. The non-transitory computer-readable medium of claim 12, wherein the request is to generate an output that contains the array, wherein the array is a subset of the input array defined by the upper bound and lower bound of the scoping function.

16. The non-transitory computer-readable medium of claim 12, wherein the request comprises a first input array and a second input array, wherein the first input array and the second input array are each configured to have a respective size and respective dimension, and wherein at least one of the element type, the size, and the dimension of the array is different than the respective element types, respective sizes, or respective dimensions of the first input array and the second input array; and wherein the request comprises a request to perform at least one task that uses a first column and a second column of one or more data tables from the plurality of data tables, wherein each row of the first column is configured to store the first input array and each row of the second column is configured to store the second input array.

* * * * *